United States Patent [19]

Baker et al.

[11] 3,857,810

[45] Dec. 31, 1974

[54] PROCESS FOR THE TRANSFORMATION OF A POLYMER DISPERSION TO A HOMOGENEOUS SOLID MASS

[75] Inventors: Alan Stuart Baker, George Green; Julian Alfred Waters, Spencers Wood, both of England

[73] Assignee: Imperial Chemical Industries Limited, London, England

[22] Filed: Feb. 13, 1973

[21] Appl. No.: 332,113

Related U.S. Application Data

[63] Continuation-in-part of Ser. No. 62,209, Aug. 7, 1970, abandoned.

[30] Foreign Application Priority Data

Aug. 14, 1969 Great Britain.................... 40643/69

[52] U.S. Cl....... 260/34.2, 260/29.1 R, 260/33.6 R, 260/33.6 UA, 260/901
[51] Int. Cl........................ C08f 45/28, C08f 47/20
[58] Field of Search...... 260/34.2, 33.6 UA, 33.6 R, 260/29.1 R, 901

[56] References Cited
UNITED STATES PATENTS

| | | | |
|---|---|---|---|
| 3,261,788 | 7/1966 | Carter et al..................... | 260/33.6 R |
| 3,607,821 | 9/1971 | Clarke et al...................... | 260/34.2 |
| 3,674,736 | 7/1972 | Lerman et al..................... | 260/34.2 |

*Primary Examiner*—Allan Lieberman
*Attorney, Agent, or Firm*—Cushman, Darby & Cushman

[57] ABSTRACT

Concentrated fluid dispersions of an amphipathic copolymer in a hemi-solvent are described, wherein the concentration of copolymer is not less than 20% by weight and is such that on heating the dispersion without loss of hemi-solvent to above the environmental glass transition temperature of the polymeric components of the copolymer which are insoluble in the hemi-solvent, and then cooling it to below that transition temperature, the dispersion is transformed into a homogeneous solid mass. No change in the chemical composition of the material is involved in this transformation. The concentrated dispersions, which are useful as casting or potting compositions, are obtained by removal of hemi-solvent, at a temperature below the environmental glass transition temperature already referred to, from a precursor dispersion which results from heating the amphipathic copolymer to above that transition temperature with a sufficient excess of hemi-solvent to give, on cooling below that temperature, a stable, fluid dispersion containing substantially spherical aggregates of the copolymer.

9 Claims, No Drawings

PROCESS FOR THE TRANSFORMATION OF A POLYMER DISPERSION TO A HOMOGENEOUS SOLID MASS

This application is a continuation-in-part of our application Ser. No. 62,209, filed Aug. 7, 1970, new abandoned.

This invention relates to concentrated, fluid dispersions of amphipathic copolymer aggregates in hemi-solvent liquids, to a process for preparing such dispersions, and to a process for converting such dispersions into homogeneous solids.

By an amphipathic copolymer we mean a graft or block copolymer comprising at least two polymeric components of molecular weight at least 500, the said components having such differences in their chemical nature that they differ significantly from each other in their solubility characteristics.

A hemi-solvent liquid is defined as a liquid or mixture of liquids which is a good solvent for one polymeric component and a non-solvent or precipitant for another polymeric component of an amphipathic copolymer. By a good solvent we mean a solvent which is better than a theta solvent, the nature of a theta solvent being discussed in "Polymer Handbook" (Ed. Brandrup and Immergut, Interscience, 1966). For the purposes of the present invention, amphipathic copolymers are further defined as being copolymers in which the weight ratio of the components insoluble in a given hemi-solvent to the components soluble in that hemi-solvent is not less than 50:50.

Amphipathic copolymers are capable of existing at low concentrations in hemi-solvent liquids in the form of substantially spherical aggregates, in which the insoluble components cluster together to form a core which is surrounded by their associated soluble components. We have found that, under suitable circumstances, concentrated dispersions of these aggregates are stable and low in viscosity and can be converted into solid materials by a simple heat treatment. They are, therefore, very suitable for use in the formulation of casting or potting compositions.

According to one aspect of the present invention, we provide a concentrated, fluid dispersion of self-stable, substantially spherical aggregates of an amphipathic block or graft copolymer as hereinbefore defined in a hemi-solvent as hereinbefore defined, wherein the concentration of the amphipathic copolymer in the hemi-solvent is not less than 20% by weight and is such that when the dispersion is heated without significant loss of hemi-solvent to a temperature above the environmental glass transition temperature of the insoluble components of the copolymer and is subsequently cooled to a temperature below the said transition temperature, the dispersion is transformed into a homogeneous solid mass.

By "environmental glass transition temperature" ("environmental Tg") we mean the temperature at which the insoluble component of the copolymer passes from the glassy to the non-glassy state, or vice versa, in the environment constituted by the hemi-solvent with which it is in contact. In general, the environmental Tg will be substantially below the Tg as normally determined for the material of the insoluble components on samples of pure high molecular weight bulk polymer. This is because (1) the hemi-solvent liquid may contain minor proportions of liquid, which, alone, would be a good solvent for the insoluble components; (2) in many cases the molecular weight of the insoluble components is relatively low; and (3) the soluble components of the copolymer are also present. Normally the environmental Tg of the material of the insoluble components measured in bulk should be at least 20°C., and preferably at least 50°C., above the maximum ambient temperature to which the dispersion will be subjected during storage. Exact determination of the environmental Tg may be carried out on polymer of the same molecular weight and composition as the insoluble polymeric components present in the amphipathic copolymer. This polymer must have been equilibrated in the relevant hemi-solvent environment. The determination may be made by differential thermal analysis or similar well known techniques.

In general, at temperatures below the environmental Tg of the insoluble components, an amphipathic copolymer as hereinbefore defined remains substantially unaffected by being brought into contact with a hemi-solvent, there being little or no tendency for the hemi-solvent to swell or to dissolve the copolymer. At temperatures above the environmental Tg, on the other hand, provided that the concentration of copolymer is not too high, such a copolymer can readily be dispersed in a hemi-solvent to give a fluid composition. In such a dispersion, the copolymer molecules tend to form discrete, substantially spherical aggregates in which, as already mentioned, the insoluble components of the copolymer cluster together to form a core which is surrounded by their associated soluble components. At these elevated temperatures, the aggregating components are believed to be liquid and mobile; the aggregates have the character of micelles and are in equilibrium in the hemi-solvent with individual molecules of the amphipathic copolymer. When the temperature of such a composition falls below the environmental Tg, it remains as a fluid dispersion of high stability and is completely miscible with further added hemi-solvent, but as a consequence of the insoluble components of the copolymer having passed into the glassy state the aggregates now have permanent identities and are preferably referred to as microparticles rather than as micelles.

When the concentration of amphipathic copolymer in the hemi-solvent is relatively high, on the other hand, a fluid composition is again formed at temperatures above the environmental Tg of the insoluble components, but the insoluble components are no longer clustered together in an orderly manner to form the cores of discrete particles; they are believed to exist in a largely disordered structure in which they may be grossly entangled with one another. Under these circumstances, lowering the temperature of the composition below the environmental Tg of the insoluble components causes it to change into a homogeneous, void-free solid mass. Such a solid mass is not miscible with added hemi-solvent and remains so indefinitely so long as its temperature is below the environmental Tg. The exact limiting value of the concentration of copolymer in hemi-solvent, below which the copolymer exists in fluid dispersion in the hemi-solvent at all temperatures and above which the composition is either fluid or solid depending on the temperature, varies from one amphipathic copolymer to another, according to its structure and molecular weight, and also varies with the particular hemi-solvent employed. The higher the molecular weight and the higher the weight fraction of the insoluble component, the lower will be this limiting concentration. When the molecular weight of the amphipathic copolymer is of the order of 10,000 and the proportion of soluble component approaches the upper limit of 50% of the total weight of the molecules, the limiting concentration may be as high as 50%. In the case of copolymers having a molecular weight of several thousands and having a ratio of insoluble to soluble components of 3:1, the limiting concentration may be in the region of 20%.

In view of the foregoing considerations, it is preferred that, in the amphipathic copolymers used in the dispersions of the invention, the weight ratio of insoluble components to soluble components should be at least 67:33. It is also preferred that the total molecular weight of the copolymer should not exceed 200,000. However, for any particular combination of amphipathic copolymer and hemi-solvent, the minimum concentration of copolymer required to give the benefits of the present invention is readily established by means of a series of simple tests.

It is further preferred that the weight ratio of insoluble to soluble components in the amphipathic copolymer should not be greater than 80:20.

The amphipathic copolymer, when prepared, should be as free as possible from any ungrafted polymer species insoluble in the hemi-solvent environment.

The temperature-dependent and concentration-dependent effects which have been described above mean that it is not possible to prepare a stable, fluid dispersion of amphipathic copolymer in hemi-solvent of a concentration higher than the aforesaid limiting concentration simply by blending together the requisite proportions of copolymer and hemi-solvent, whether this be done at temperatures below or above the environmental Tg of the insoluble components. The essence of the present invention lies in a two-fold discovery: firstly, that it is possible to remove sufficient hemi-solvent from a stable, fluid dispersion of amphipathic copolymer aggregates to raise its concentration above the limiting concentration referred to above without destroying its stability or fluidity, so long as this is done at a temperature below the environmental Tg of the insoluble components; secondly, that by heating such a concentrated dispersion to a temperature above the environmental Tg and then cooling it to a temperature below the environmental Tg, it is converted into a homogeneous solid. The solid so obtained is similar to that which results from a process of heating a mixture of high concentration of amphipathic copolymer in hemi-solvent to a temperature above the environmental Tg and then cooling it below the environmental Tg, as described above.

In selecting suitable hemi-solvents for any given amphipathic copolymer, it is necessary to appreciate that the difference in solubility of the two components will generally derive from differences in polarity. Therefore, the principle to be observed is that "like dissolves like"; that is polar polymeric components are dissolved by liquids of similar polarity, or a highly polarizable liquid, while non-polar polymeric components are solvated by non-polar liquids. Those liquids which will or will not dissolve polymeric components of given polarity are well known to those skilled in the art and are illustrated for example in British Patent Specification No. 1,052,241 and in page IV - 185 – 234 of "Polymer Handbook" (Ed. Brandrup and Immergut, Interscience 1966).

For example, non-polar liquids such as aliphatic or cyclo-aliphatic hydrocarbons or long chain alcohols will dissolve non-polar polymeric components such as:
  copolymers of ethylene and copolymers of propylene;
  polymers of vinyl stearate;
  polymers of an ester of a long chain alcohol with acrylic or methacrylic acid;
  polyesters derived from a long chain hydroxy carboxylic acid;
but will not dissolve polar polymeric components such as:
  polymers of an ester of a short chain alcohol with acrylic or methacrylic acid;
  polyesters of a short chain hydroxy carboxylic acid;
  polyvinyl chloride;
  polyacrylonitrile.

Conversely, polar liquids will not dissolve non-polar polymeric components such as those listed above, but they will dissolve polar polymeric components such as those listed above.

The preparation of graft or block copolymers from such polymeric components is well known to those skilled in the art and reference may be made to British Patent Specification No. 1,122,397 and to "Graft Copolymers" (Battaerd and Tregear, Interscience 1967) and "Copolymerisation" (Ham, Interscience 1964).

When the amphipathic copolymer is a graft copolymer, it is preferred that it should be of the type in which a polymeric backbone has grafted on to it a plurality of polymeric side-chains, and that the backbone should constitute the insoluble component of the copolymer and the side-chains the soluble components. Where the amphipathic copolymer is a block copolymer, it may be advantageous in certain cases if it is of the ABA type, where the A blocks constitute the soluble components and the B block the insoluble component.

According to another aspect of the present invention, we provide a process for preparing a concentrated fluid dispersion of amphipathic copolymer in a hemi-solvent which comprises (i) heating an amphipathic block or graft copolymer as hereinbefore defined with a hemi-solvent as hereinbefore defined to a temperature above the environmental Tg of the polymeric components of the copolymer which are insoluble in the hemi-solvent, the proportion of hemi-solvent to copolymer employed being such that the resulting fluid composition on cooling to a temperature below the said environmental Tg forms a stable, fluid precursor dispersion of substantially spherical aggregates of the copolymer, and (ii) removing from the said precursor dispersion at a temperature below the environmetnal Tg a sufficient proportion of hemi-solvent to give a dispersion having a copolymer concentration which is not less than 20% by weight and is such that when the said concentrated dispersion is heated without significant loss of hemi-solvent to a temperature above the environmental Tg and is subsequently cooled to a temperature below the environmental Tg, the dispersion is transformed into a homogeneous, solid mass.

Preferably the removal of part of the hemi-solvent from the precursor dispersion first obtained, in order to provide the final, concentrated dispersion, is carried out by distillation, if necessary under reduced pressure so that the hemi-solvent can be volatilised without the environmental Tg of the insoluble components being exceeded. It is, however, essential to ensure that, as such volatile constituents of the dispersion are removed, the remaining liquid phase of the dispersion must still be a hemi-solvent for the amphipathic copolymer.

In performing step (i) of the process hereinbefore defined, the temperature to which the amphipathic copolymer is initially heated with the hemi-solvent may be only just above that at which the insoluble components cease to be in the glassy form. However, the rate at which the copolymer becomes dispersed in the hemi-solvent depends upon the extent to which the temperature used exceeds the environmental Tg of the insoluble components and it is, therefore, preferred that the copolymer is heated to a temperature of up to 100°C. above the environmental Tg.

According to a still further feature of the present invention, we provide a process for converting a concentrated fluid dispersion of spherical aggregates of amphipathic block or graft copolymer in a hemi-solvent as hereinbefore described into a homogeneous solid mass, the process comprising heating the concentrated dispersion, without significant change in the concentration of the copolymer in the hemi-solvent, to a temperature above the environmental Tg of the insoluble components of the copolymer and subsequently cooling the resulting fluid composition to a temperature below the said environmental Tg.

Referring to the foregoing discussion of the influence of temperature and concentration upon the nature of compositions comprising an amphipathic copolymer and a hemi-solvent, it may be surmised that, in the preparation of the concentrated, fluid copolymer dispersions according to the process hereinbefore defined, the fact that the removal of part of the hemi-solvent from the relatively dilute precursor dispersion is performed at a temperature at which the insoluble components of the copolymer are in the glassy state means that the microparticles of copolymer present have no possibility of re-arranging their structure into that which they would otherwise possess under the conditions of relatively high concentration, namely a structure which is not one of essentially spherical particles but is believed, as already stated, to be a disordered arrangement in which the insoluble components may be grossly entangled with one another. However, as soon as the concentrated dispersion is heated to a temperature above the environmental Tg, such a rearrangement of structure can occur because of the mobility of the insoluble components. On cooling below the environmental Tg once more, the postulated disordered, entangled structure persists and the composition becomes an apparently homogeneous, solid mass. It retains this form indefinitely, so long as the lower temperature is maintained, even in prolonged contact with added hemi-solvent.

In converting the concentrated, fluid dispersion to a solid product according to the process hereinabove defined, it is preferred that the dispersion should be heated to a temperature which is very appreciably above the environmental Tg of the insoluble components of the copolymer, for example at least 100°C. above that temperature. In general, this preferred temperature of heating will be higher than the temperature to which the amphipathic copolymer and hemi-solvent are heated in the initial preparation of the relatively dilute precursor dispersion. This preference is based on the fact that the greater the difference between the environmental Tg and the temperature at which conversion to the disordered structure is effected, the greater is the rigidity and strength of the solid mass obtained on cooling. This effect is believed to be attributable to the existence of a higher energy barrier towards transition, from the ordered, essentially spherical aggregated structure of the copolymer molecules to the disordered, entangled structure than that which operates in the reverse transition.

From the foregoing description it will be evident that the concentrated copolymer dispersions of the invention possess the remarkable property of existing for unlimited periods as stable fluids of low viscosity at ambient temperatures and yet of being susceptible of rapid conversion, by a simple heating and cooling process, into a homogeneous solid mass without any change whatever in their chemical composition. The concentrated dispersions are, therefore, admirably suitable for use as casting and potting compositions, for example for the encapsulation and protection of electronic equipment and other articles of a delicate nature. The absence of any chemical reaction from the process means that there is no risk of attack upon the articles being so treated by reactive chemical species, nor is there any risk of local overheating due to exothermic effects. In carrying out such casting or encapsulating operations, some form of containing mould will normally be employed and two alternative methods are available. In the first method, the concentrated fluid dispersion is poured into the mould (in which any article to be encapsulated has already been placed) at ambient temperature; the mould and contents are then heated to a temperature above the environmental Tg and subsequently allowed to cool. In the second method, the concentrated fluid dispersion is separately heated to above the environmental Tg and is then poured into the mould and allowed to cool. Where other considerations permit, the first method is to be preferred since the viscosity of the concentrated dispersion at ambient temperature is normally lower than that of the same composition at a temperature above the environmental Tg, due to the disordered structure of the latter. If the second method is to be employed, it is desirable to heat the dispersion to a higher temperature than is employed in the first method, in order to offset this viscosity increase.

The invention is illustrated by the following Examples, in which parts and percentages are by weight unless otherwise stated.

EXAMPLE 1

In this Example there was employed an amphipathic graft copolymer prepared in known manner having a backbone of poly(methyl methacrylate) and side chains of poly(12-hydroxystearic acid) in a weight ratio of 75/25 respectively. The molecular weight of the copolymer was approximately 56,000 and of the side chains approximately 1700. Hence the average number of side chains per molecule was 8.

To a gelatinous solid consisting of 40 parts of the above graft copolymer mixed with 60 parts of high-boiling aliphatic hydrocarbon, which contained large irregular aggregates, were added 280 parts of medium-boiling aliphatic hydrocarbon (boiling point approximately 160°C.). Both hydrocarbons were hemi-solvents for the copolymer. The temperature of the mixture was raised to 160°C. and maintained at that temperature for one hour with stirring to form a dispersion of aggregates in hydrocarbon in which the poly(hydroxystearic acid) component was soluble. The dispersion was allowed to cool to 80°C. to form microparticles. At this stage, the polymer concentration was 11%. The dispersion was concentrated by removing medium-boiling aliphatic hydrocarbon by distillation under reduced pressure at temperatures below 80°C. (i.e. below the environmental Tg of the poly(methyl methacrylate)backbone).

The resulting concentrated dispersion had a polymer content of 40%, a viscosity of approximately 2 poises at 25°C., and was completely miscible at room temperature with the above medium-boiling aliphatic hydrocarbon.

A portion of the concentrated, fluid dispersion was poured into a glass mould, which was then slowly heated until the temperature of the contents reached approximately 140°C. (i.e. above the environmental Tg of the poly(methyl methacrylate) backbone); the mould and contents were then allowed to cool to room temperature. The mould was found to contain a translucent, slightly opalescent gelatinous solid which was immobile and could not be poured. The combined weight of the mould and its contents was the same before and after the heat treatment.

Another portion of the concentrated fluid dispersion was treated in the manner just described, except that the temperature of the contents of the mould was raised to 170°C. before cooling. In this case the mould was found to contain a clear, wax-like solid. There was again no loss in weight of material during the heat treatment.

When, by way of comparison, 20 parts of the above graft copolymer were added to a mixture of 30 parts of the high-boiling aliphatic hydrocarbon and 16.6 parts only of the medium-boiling aliphatic hydrocarbon, the mixture was heated at 160°C. for one with stirring and then allowed to cool, the product had the appearance of a gelatinous solid, was of very high viscosity and was immiscible at room temperature with an increasing volume of the mixed hydrocarbons used. The polymer concentration of this product was 30%, viz. less than that of the concentrated fluid dispersion described above.

EXAMPLE 2

In this Example there was employed an amphipathic graft copolymer, prepared in known manner having a backbone of poly-(methyl methacrylate) and sidechains of poly(12-hydroxystearic acid) in a weight ratio of 70:30. The molecular weight of the copolymer was approximately 47,000 (peak, as determined by gel phase chromatography) and that of the side-chains 2,400. 20 parts of this graft copolymer and 180 parts of aliphatic hydrocarbon (boiling range 205 – 215°C.) were heated at reflux temperature for 30 minutes; the temperature was then lowered to 80°C. and aliphatic hydrocarbon removed by distillation under reduced pressure until the residue had a polymer content of 45%. The concentrated, fluid dispersion so obtained was then heated momentarily to reflux temperature, at which it had the consistency of a mobile syrup; no significant evaporation of the hemi-solvent hydrocarbon occurred during this operation. The hot syrup was then poured into a mould and allowed to cool. The resulting product was a clear, rubbery solid which could not be poured and which was free from voids, bubbles or cracks.

EXAMPLE 3

In this Example, the rubbery solid obtained as described in Example 2, consisting of 45% graft copolymer and 55% hemi-solvent, was employed as starting material. This solid was broken up into irregular fragments of about 1 cm. diameter.

In a first experiment, a portion of the solid fragments was covered with sufficient hemi-solvent aliphatic hydrocarbon (boiling range 100 – 120°C.) to give a polymer concentration in the total mixture of 8.5%. The mixture was left at room temperature and examined at intervals over a period of three years. No change in the appearance of the material was observed over the whole of this period, the fragments of solid being unaffected and the hemi-solvent remaining as separate, fluid phase.

In a second experiment, a further portion of the solid fragments was mixed with hemi-solvent as in the first experiment to give a polymer concentration of 8.5%. The mixture was then heated at 90 – 95°C. for 30 minutes with stirring and allowed to cool. The product was an opalescent, fluid and homogeneous dispersion of spherical microparticles of copolymer which were completely stable and showed no tendency to flocculate or aggregate, either when subjected to high shear or when stored at room temperature for three years.

In a third experiment, a portion of the stable dispersion obtained in the second experiment was concentrated by removal of the lower boiling hemi-solvent by distillation at 80°C. under sub-atmospheric pressure. The product obtained had a polymer concentration of 45%, but, although similar in chemical composition to the solid fragments used in the first experiment, it was a fluid dispersion, having a viscosity of 0.8 poise at 25°C. when measured at a shear rate of $10^4$ sec.$^{-1}$ and showing no tendency to flocculate or aggregate. When a portion of the dispersion was diluted with the low boiling aliphatic hydrocarbon to a polymer content of 8.5%, it resembled in all respects the product from the second experiment described above.

In a further experiment, a portion of the dispersion of polymer content 8.5% produced in the second experiment was concentrated by removing hemi-solvent by distillation under atmospheric pressure until the polymer content was 45%. The final temperature of the concentrated dispersion was 205°C. On cooling to room temperature, the product obtained was a clear, rubbery solid which was identical in appearance to the product described in Example 2.

We claim:

1. A process for converting, into a homogeneous solid mass, a concentrated, fluid dispersion of self-stable, substantially spherical aggregates of an amphipathic block or graft copolymer in a hemi-solvent, the amphipathic copolymer comprising at least two polymeric components of molecular weight at least 500 which differ significantly from each other in their solublity characteristics, the hemi-solvent being a liquid or mixture of liquids which is a good solvent for one of the said polymeric components and a non-solvent for another of the said components and the weight ratio in the amphipathic copolymer of the components insoluble in the hemi-solvent to the components soluble in the hemi-solvent being not less than 50:50, wherein the concentration of the amphipathic copolymer in the hemi-solvent is not less than 20% by weight, said process comprising heating the concentrated dispersion without significant change in the concentration of the copolymer in the hemi-solvent to a temperature above the environmental glass transition temperature of the insoluble components of the copolymer and subsequently cooling the resulting fluid composition to a temperature below the said transition temperature.

2. A process according to claim 1, wherein the weight ratio of the insoluble components to the soluble components in the copolymer is at least 66:33.

3. A process according to claim 1, wherein the weight ratio of the insoluble components to the soluble components in the copolymer is not greater than 80:20.

4. A process according to claim 1, wherein the total molecular weight of the amphipathic copolymer is not greater than 200,000.

5. A process according to claim 1, wherein the amphipathic copolymer comprises a polymeric backbone insoluble in the hemi-solvent and, grafted on to the backbone, a plurality of polymeric side-chains soluble in the hemi-solvent.

6. A process according to claim 1, wherein the concentrated dispersion is heated to a temperature at least 100°C. above the environmental glass transition temperature of the insoluble components of the copolymer.

7. A process as claimed in claim 1 in which said concentrated fluid dispersion is prepared by a process which comprises (i) heating the amphipathic block or graft copolymer with hemi-solvent to a temperature above the environmental glass transition temperature of the components of the copolymer which are insoluble in the hemi-solvent, the proportion of hemi-solvent to copolymer employed being such that the resulting fluid composition on cooling to a temperature below the said transition temperature forms a stable, fluid precursor dispersion of substantially spherical aggregates of the copolymer, and (ii) removing from the said precursor dispersion at a temperature below the said transition temperature a sufficient proportion of hemi-solvent to give a concentrated dispersion having a copolymer concentration which is not less than 20% by weight and is such that when the said concentrated dispersion is heated without significant loss of hemi-solvent to a temperature above the said transition temperature and is subsequently cooled to a temperature below the said transition temperature, the dispersion is transformed into a homogeneous solid mass.

8. A process according to claim 7, wherein the removal of hemi-solvent from the precursor dispersion is effected by distillation.

9. A process according to claim 7, wherein the amphipathic copolymer is heated with hemi-solvent in stage (i) of the process at a temperature of up to 100°C. higher than the environmental glass transition temperature of the insoluble components of the copolymer.

* * * * *